L. JOHNSON.
TRACTOR.
APPLICATION FILED NOV. 10, 1919.

1,348,720.

Patented Aug. 3, 1920.
4 SHEETS—SHEET 1.

Witnesses
R. C. Thomas

Inventor
Ludwig Johnson.

By Victor J. Evans
Attorney

Inventor
Ludwig Johnson

Witnesses
H. G. Thomas.

By Victor J. Evans
Attorney

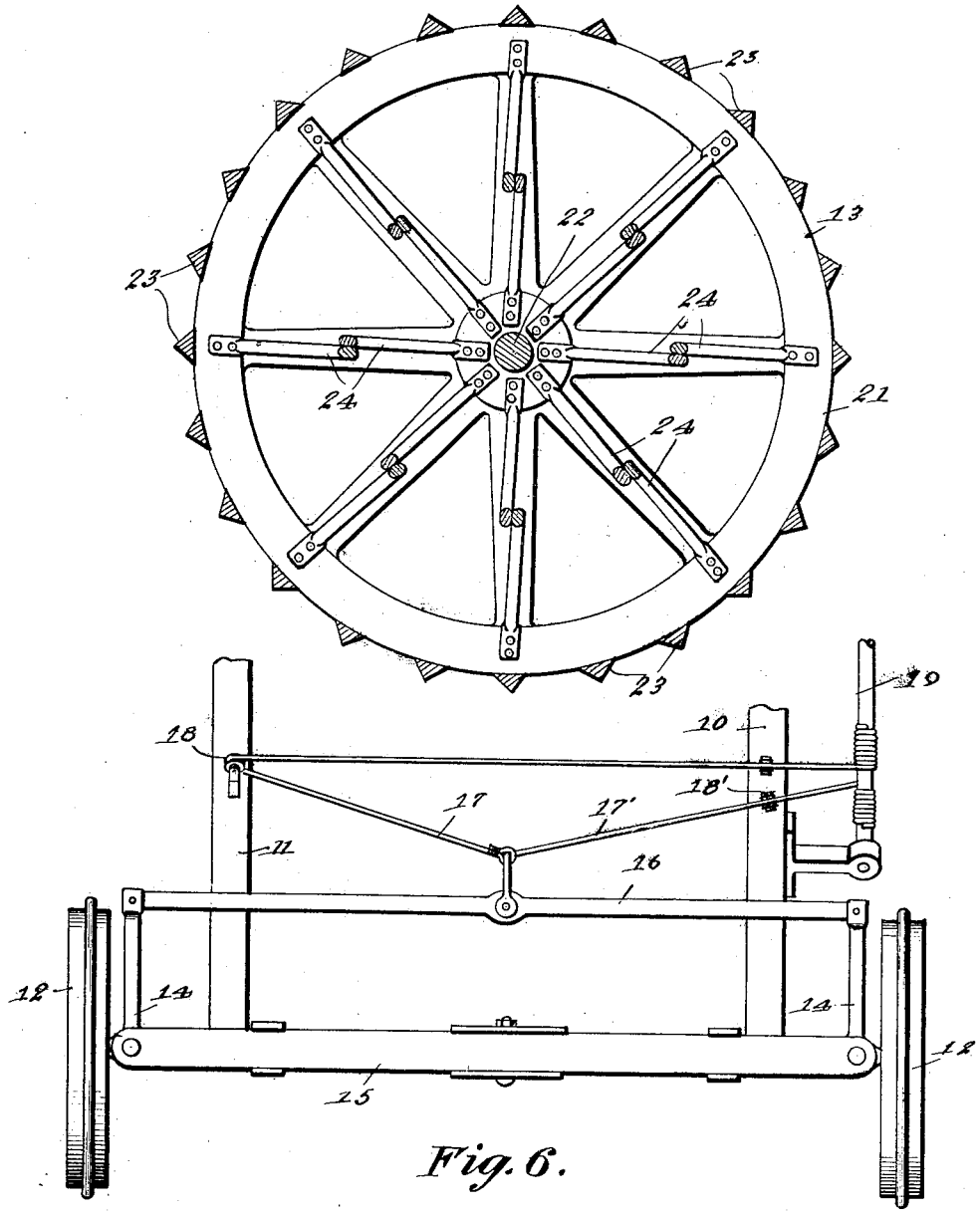

UNITED STATES PATENT OFFICE.

LUDWIG JOHNSON, OF HELENA, MONTANA.

TRACTOR.

1,348,720.   Specification of Letters Patent.   Patented Aug. 3, 1920.

Application filed November 10, 1919. Serial No. 336,775.

*To all whom it may concern:*

Be it known that I, LUDWIG JOHNSON, a citizen of the United States, residing at Helena, in the county of Lewis and Clark and State of Montana, have invented new and useful Improvements in Tractors, of which the following is a specification.

This invention relates to tractors, and comprehends a construction which is as light as possible, consistent with the desired strength and durability, the invention embodying among other features a comparatively wide tractor wheel, which under the weight of a load obtains an effective purchase upon the ground, the wheel having a chain drive, and a novel construction of means for varying the speed of the tractor.

The nature and advantages of the invention will be better understood when the following detail description is taken in connection with the accompanying drawings, the invention residing in the construction, combination and arrangement of parts as claimed.

In the drawings forming part of this specification, like numerals of reference indicate similar parts in the several views and wherein—

Fig. 5 is an enlarged sectional view through the tractor wheel.

Fig. 6 is a fragmentary bottom plan of the forward end of the machine to illustrate the steering mechanism.

Figure 1:
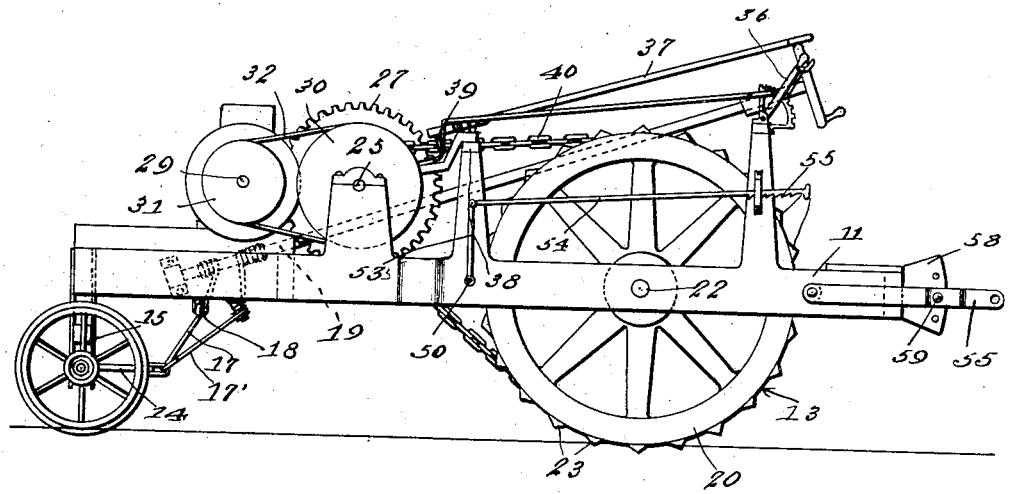
Figure 1 is a side elevation of the tractor.
Figure 2:
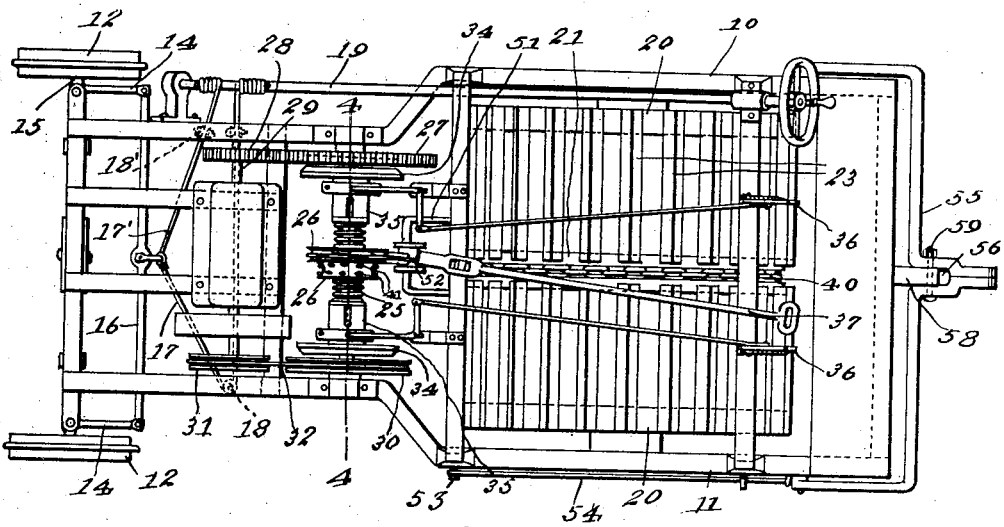
Fig. 2 is a top plan view.
Figure 3:
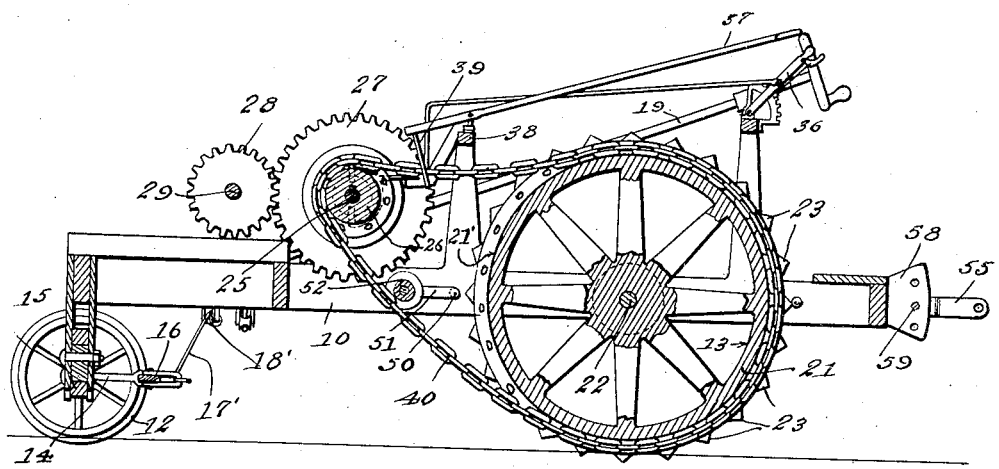
Fig. 3 is a longitudinal sectional view.
Figure 4:
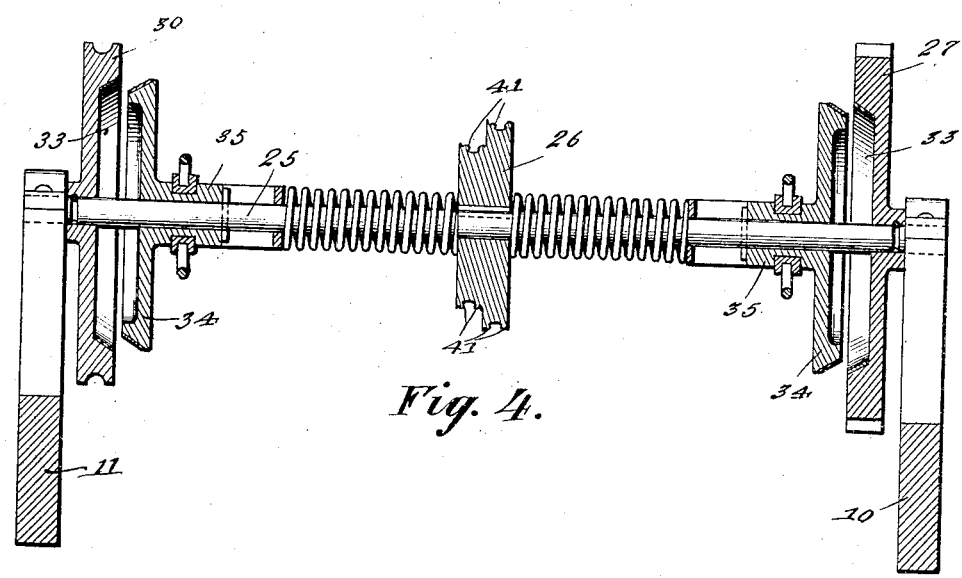
Fig. 4 is a transverse sectional view taken on the line 4—4 of Fig. 2.
Figure 7:
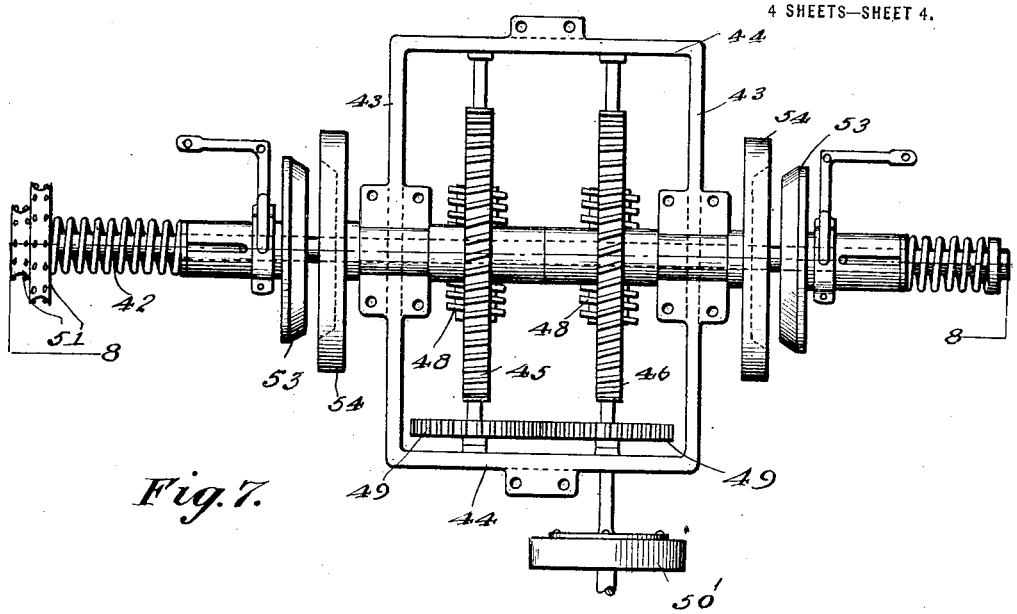
Fig. 7 is a plan view of the forward part of the tractor illustrating a modification of the transmission mechanism.
Figure 8:
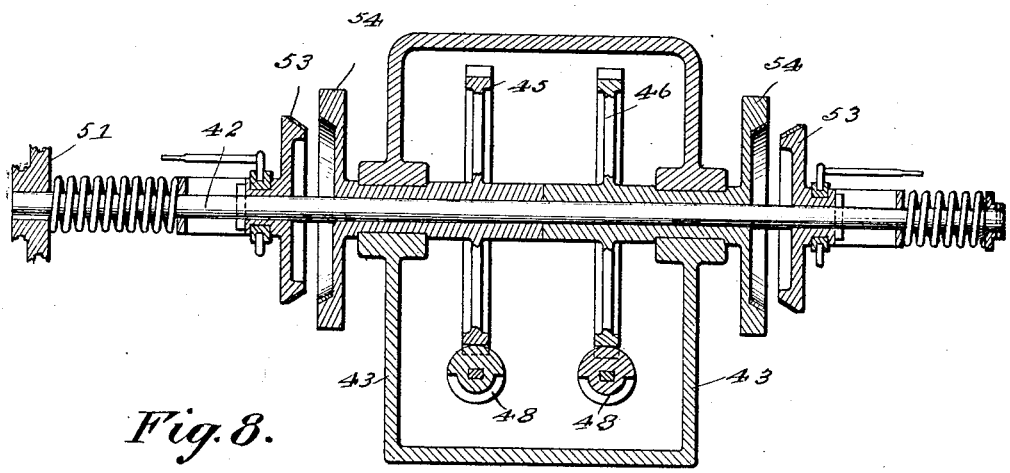
Fig. 8 is a sectional view taken on the line 8—8 of Fig. 7.
Figure 9:
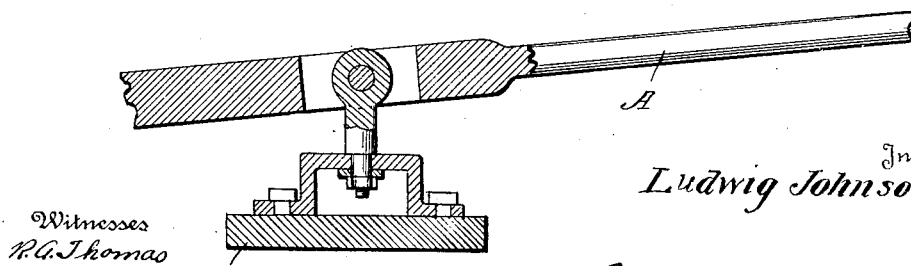
Fig. 9 is a fragmentary view partly in section of the speed controlled lever and its support.

The tractor forming the subject matter of my invention comprises a frame having spaced parallel side members 10 and end members 11. The frame is narrow at the front and wider at the rear as shown. The frame is supported by two front wheels 12 and a relatively large tractor wheel 13. The wheels 12 are journaled upon the spindles of steering knuckles 14 connected with the front axle 15, while the tractor wheel 13 is journaled between the side members 10 of the wide end of the frame, the wheel 13 filling the space between the side members as shown. The steering knuckles 14 are connected by the connecting rod 16 for the purpose of simultaneously turning the wheels for the steering of the tractor.

For this purpose, one end of a flexible element 17 is connected with the rod 16 at a point approximately central thereof, the flexible element being extended in the direction of the left hand side of the machine and trained over a pulley 18, and extended in the direction of the right hand side of the machine where it is connected with the steering post 19 to be wound and unwound therefrom. A flexible element 17' has one end connected with the flexible element 17 at its point of juncture with the connecting rod, the flexible element 17' being extended in the direction on the right hand side of the machine, being trained over a pulley 18' and connected with the steering post 19 to be wound thereabout and unwound therefrom as will be readily understood. When the steering post 19 is turned in one direction to steer the tractor to the left, the flexible element 17 is unwound from the steering post 19 while the flexible element 17' is wound about the latter. When the column is rotated in a reverse direction to steer the tractor to the right, the flexible elements 17 and 17' respectively are wound and unwound therefrom.

The tractor wheel embodies a pair of relatively large end wheels 20 and an intermediate wheel 21, the said wheels being mounted on the axle 22, journaled between the side members 10 of the wide portion of the frame. The end wheels 20 are connected with the intermediate wheel by the ground engaging elements 23, the latter being secured in any suitable manner to the periphery of said wheels and preferably of V-shaped formation in cross section to obtain an effective purchase upon the ground or surface. The tractor wheel is very light, yet it is sufficiently strong and heavy enough to stand the strain to which it is subjected, the end wheels 20 being braced by a plurality of reinforcing elements 24 which are arranged in pairs and crossed as shown, the reinforcing elements 24 connecting the end wheels with the intermediate wheel 21. The intermediate wheel 21 is grooved as at 21' the said groove receiving the drive chain which is trained over the intermediate wheel and one of the pulleys fixed upon the transmission shaft 25. The pulleys 26 are fixed relatively and vary in diameter to control the speed of the tractor. A large gear wheel 27 loosely mounted upon one end of the transmission shaft 25 meshes with a small pinion 28 fixed upon the adjacent end of an engine shaft 29, the gears 27 and 28 being utilized for propelling the tractor in a forward direction. Loosely mounted upon the opposite end of the transmission shaft 25 is a large pulley 30 over which and a small pulley 31 fixed upon the adjacent end of the engine shaft 29 is trained an endless belt or chain 32. The pulleys 30 and 31 provide for the reversing of the tractor as the occasion requires. Both the large gear wheel 27 and the large pulley 30 have their confronting faces recessed as at 33 to receive the disks 34 of a clutch mechanism, the faces of said recesses as well as the adjacent faces of the disk 34 being lined with leather or other suitable material to prevent slipping of the clutch. The disks 34 are carried by collars 35 which are slidably mounted upon the transmission shaft 25 and operatively connected with a lever 36 for throwing either of the disks into engagement with its coöperative parts for locking the latter upon the shaft 25. In order words, if one of the disks 34 is moved into engagement with the large gear wheel 27 the latter would be locked upon the shaft, whereby the latter would be rotated to propel the tractor in a forward direction. The disk 34 is moved into engagement with the large pulley 30, whereby the latter is locked upon the shaft 25 to reverse the movement of the tractor. It is of course obvious that both the large gear wheels 27 and the pulley 30 continuously rotate.

With a view of changing the speed of the tractor, I provide a lever 37 which is connected adjacent one of its ends with the support 38 in a manner whereby the lever is permitted both a vertical and horizontal swinging movement. Depending from one end of the lever 37 is an eye or loop 39 through which the upper run of the drive chain 40 passes. This run of the chain which is always taut engages the eye or loop 39 holding the opposite end of the lever 37 normally elevated. When it is desired to change the speed of the tractor, the elevated end of the lever 37 is depressed, thus moving the opposite end of the lever in an upward direction and lifting the adjacent run of the chain 40 above the flange of the pulley over which it is trained. The lever 37 is then swung horizontally in the proper direction to shift the driven chain upon the next of the pulleys 26. When the lever 37 is released, the adjacent run of the drive chain 40 becomes taut lowering the adjacent end of the lever and elevating the opposite end thereof which is the normal position of parts. Both of the pulleys 26 are provided with projections 41 to prevent slipping of the drive chain. The construction is such that the tractor weighs considerably less than the weight of the ordinary tractor, and yet is sufficiently strong and durable. The tractor wheel 13 is of such width that it covers enough surface to prevent slipping of the wheel. The tractor wheel is also arranged very close to the crank shaft, and therefore gets the full benefit of the maximum motive power. In the construction thus far described, it will be noted that the motor is arranged transversely of the frame but I contemplate a construction whereby the motor can be arranged lengthwise.

To this end, the transmission shaft 42 is journaled between the side walls 43 of a casing including end walls 44. The shaft 42 projects an appreciable distance beyond the side walls 43. Loosely mounted upon the shaft 42 are spaced gear wheels 45 and 46 respectively which are arranged within the casing as shown. Each of the gears 45 and 46 mesh with one of a pair of worm shafts 48 journaled between the end walls 44 of said casing, the said shafts having pinions 49 meshing with each other. One of the shafts 48 projects beyond the adjacent end wall and supports the fly wheel 50. Fixed upon one end of the shaft 42 are the pulleys 51 of relatively different diameters over which the drive chain is adapted to be trained as well as over the intermediate disk 21 of the tractor wheel. The clutch disks 53 are slidably mounted upon the shaft 42 at opposite sides of the casing and coöperate with the coöperating clutch members 54. The clutch in this instance is constructed and operated the same as hereinabove described in connection with the preferred form of the invention. Manifestly, the cog gear wheels 45 and 46 are rotated continuously in reverse directions and when one or the other of the wheels are fixed to the shaft 42 by means of the clutch mechanism, the tractor will be driven in the forward or reverse direction.

A chain tightener is used in connection with the invention, the chain tightener including a shaft 50 journaled on the frame in advance of the drive wheel, the shaft including a crank portion 51 as shown. A roller 52 is carried by the crank portion 51 of said shaft, to engage the adjacent run of the chain at different points. The roller engages the run of the chain at the highest point when the tractor is in low speed, and engages the chain at a different point when it is desired to shift the chain from the smallest to the largest of said pulleys 41. The shaft 50 is connected at one end to a vertically disposed arm 53, the upper end of this arm being secured to the adjacent end of an operating rod 54 which extends through a keeper, the rod being provided with teeth 55 to engage the keeper so that the shaft may be maintained in any adjusted position.

The draw bar 55 is in the form of a U-shaped member pivoted to the opposite sides of the frame and formed at a point intermediate its ends to provide a slot 56 for the reception of a guide plate 58 which is secured to one end of the frame. The guide plate 58 is provided with a plurality of openings with which the openings in the draw bar are adapted to register for the reception of a fastening element 59.

While it is believed that from the foregoing description, the nature and advantages of the invention will be readily apparent, I desire to have it understood that I do not limit myself to the exact construction and arrangement of parts disclosed and that such changes may be resorted to when desired as fall within the scope of what is claimed.

Having thus described my invention what I claim as new is:

1. A tractor comprising a frame, having spaced side and end members, steering wheels, a comparatively large tractor wheel journaled between said side members and including end disks and an intermediate groove disk, ground engaging elements connecting said disks, a motor driven shaft, pulleys fixed upon said shaft, said pulleys being of different diameters, a drive chain trained over said intermediate disk and one of said pulleys, a lever mounted for vertical and horizontal swinging movement, an eye carried by one end of the lever through which the adjacent run of the chain passes, said chain normally holding one end of the lever elevated, said lever being operable to shift the chain from one of said pulleys to the other to vary the speed of the tractor.

2. A tractor comprising a frame, steering wheels therefor, a comparatively large tractor wheel, an intermediate groove, a motor driven shaft, pulleys fixed upon said shaft, said pulleys being of different diameters, a drive chain trained over said tractor wheel and arranged within said groove, and over one of said pulleys, the crank shaft, a pinion fixed on one end of the crank shaft, a large gear loosely mounted upon a driven shaft and meshing with said pinion, relatively large and small pulleys fixed upon said driven shaft and the adjacent end of the crank shaft, an endless belt trained over said pulleys, and clutch mechanism for holding either the said large pulley or large gear fixed to the driven shaft for the purpose specified.

3. A tractor comprising a frame, having spaced side and end members, steering wheels a comparatively large tractor wheel journaled between the side members and having an intermediate groove, a motor driven shaft, pulleys fixed upon said shaft, said pulleys being of different diameters, a drive chain trained over the tractor wheel and arranged in said groove, and over one of said pulleys, a large gear loosely mounted on said shaft, a pulley loosely mounted on said shaft, a crank shaft, a pinion fixed on said shaft and meshing with said gear, a small pulley mounted on the opposite end of the crank shaft in alinement with said loose pulley, an endless belt trained over said pulleys, clutch mechanism for holding either the large gear or the loose pulley fixed relative thereto the driven shaft for propelling the tractor in reverse direction, a lever mounted upon the frame for vertical and horizontal swinging movement, and means connecting the lever with the drive chain for shifting the latter from one to the other of said fixed pulleys to vary the speed of the tractor.

In testimony whereof I affix my signature.

LUDWIG JOHNSON.